(12) United States Patent
Zavada et al.

(10) Patent No.: US 10,836,195 B2
(45) Date of Patent: Nov. 17, 2020

(54) INKJET PROCESS FOR THREE-DIMENSIONAL RELIEF ON TILES

(71) Applicant: ELECTRONICS FOR IMAGING, INC., Fremont, CA (US)

(72) Inventors: Mark Zavada, Wixom, MI (US); Matthew Tennis, Fenton, MI (US); David Weber, Middleton, WI (US); Alexander Meranto, Ferndale, MI (US); Carlos Carratalá, Vila-Real (ES); Fernando Tomás Badenes, Onda (ES); Louis Justus Fage, Redford, MI (US); Ursula Good, Jackson, MI (US); Paul Andrew Edwards, Kalamazoo, MI (US); Robert Roggers, Clinton, MI (US); John Hansen, Webberville, MI (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 16/154,525

(22) Filed: Oct. 8, 2018

(65) Prior Publication Data

US 2020/0108650 A1 Apr. 9, 2020

(51) Int. Cl.
*B41M 5/00* (2006.01)
*B41J 2/21* (2006.01)
(Continued)

(52) U.S. Cl.
CPC ............. *B41M 5/007* (2013.01); *B41J 2/21* (2013.01); *B41M 5/0047* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553;
(Continued)

(56) References Cited

U.S. PATENT DOCUMENTS 2,875,543 A 3/1959 Sylvester et al.
3,804,657 A * 4/1974 Eyman ................. D06N 7/0005
428/161

(Continued)

*Primary Examiner* — Manish S Shah
(74) *Attorney, Agent, or Firm* — Perkins Coie LLP

(57) ABSTRACT

A technique is described for the application of three-dimensional (3D) relief to a substrate such as a ceramic tile using digital inkjet technology. In an example embodiment, the introduced technique includes application of binder ink to a portion of the surface of a substrate using a digital inkjet process. This binder ink forms a barrier layer which protects the portion of the surface of the substrate. Next, a brushing process is applied to remove unprotected portions of the substrate, thereby forming the 3D relief in the substrate.

11 Claims, 10 Drawing Sheets

(51) Int. Cl.
*C04B 41/86* (2006.01)
*C09D 11/322* (2014.01)
*B41M 7/00* (2006.01)

(52) U.S. Cl.
CPC .............. *B41M 7/009* (2013.01); *C04B 41/86* (2013.01); *C09D 11/322* (2013.01)

(58) Field of Classification Search
CPC ...... B41J 2/1606; B41J 2/1642; B41J 2/1609; B41J 2/164; B41J 2/162; B41J 2/161; B41J 2/19; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106
See application file for complete search history.

(56) References Cited

U.S. PATENT DOCUMENTS

| | | | |
|---|---|---|---|
| 4,225,374 A * | 9/1980 | Kaufmann | B32B 37/26 156/220 |
| 5,946,220 A | 8/1999 | Lemelson | |
| 6,402,823 B1 * | 6/2002 | Garcia Sainz | C09D 11/40 106/31.62 |
| 2010/0291362 A1* | 11/2010 | Vignali | B41M 5/007 428/210 |
| 2012/0215340 A1 | 8/2012 | Conrad | |
| 2013/0265376 A1 | 10/2013 | Gil-Torrente et al. | |
| 2013/0310247 A1 | 11/2013 | Linhart et al. | |
| 2014/0196618 A1* | 7/2014 | Pervan | B41J 3/407 101/32 |
| 2016/0311231 A1* | 10/2016 | Zavada | B41J 3/407 |
| 2017/0107388 A1* | 4/2017 | Wang | C09D 7/61 |
| 2017/0218520 A1 | 8/2017 | De Mondt et al. | |

* cited by examiner

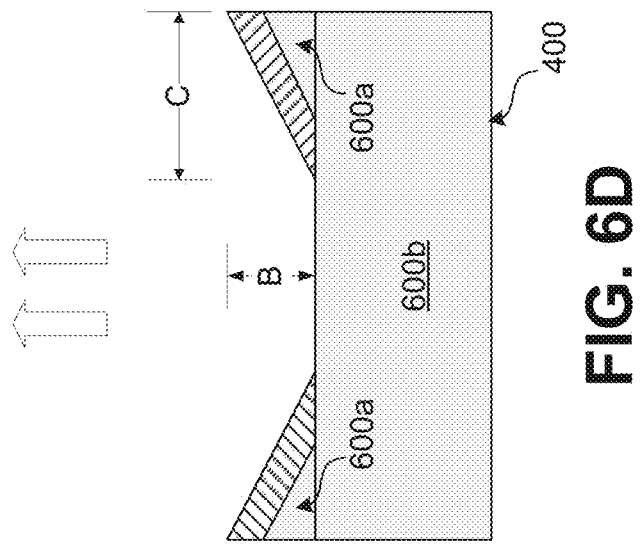

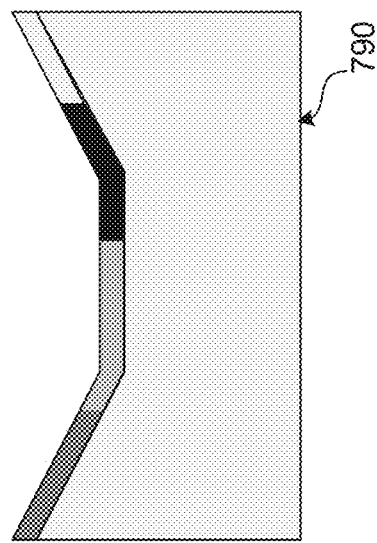
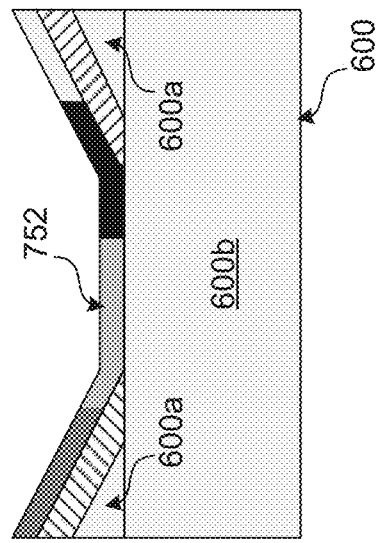
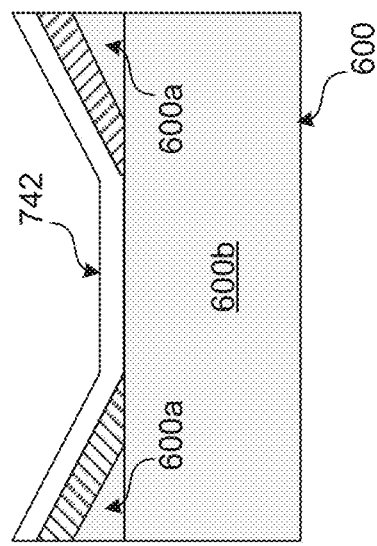
FIG. 7A
FIG. 7B
FIG. 7C

INKJET PROCESS FOR THREE-DIMENSIONAL RELIEF ON TILES

TECHNICAL FIELD

The present disclosure generally relates to processing techniques for forming textured relief in substrates such as ceramic tiles.

BACKGROUND

Tiles have a wide range of applications as building materials (e.g., for flooring) or as decorative objects. Various processes have been developed to apply three-dimensional (3D) relief to tiles, for example, to improve functionality and/or add ornamentation. Existing approaches for adding 3D relief to a tile include digital processes such as: additive processes whereby ceramic material is applied to the surface of a tile, subtractive-like processes whereby a ceramic fluxing material is applied to the glazed surface of a tile, and wax-resist processes whereby a wax-like material is applied to the surface of a tile prior to glazing, as well as analog stamping processes whereby tile body powders are pressed in a mold.

BRIEF DESCRIPTION OF THE DRAWINGS

FIGS. 6A-6D show a sequence of illustrative diagrams depicting processing of a second substrate according to the process of FIG. 5;

FIGS. 7A-7C show a sequence of illustrative diagrams depicting processing of the second substrate according to the process of FIG. 3;

DETAILED DESCRIPTION

Overview

Figure 1:
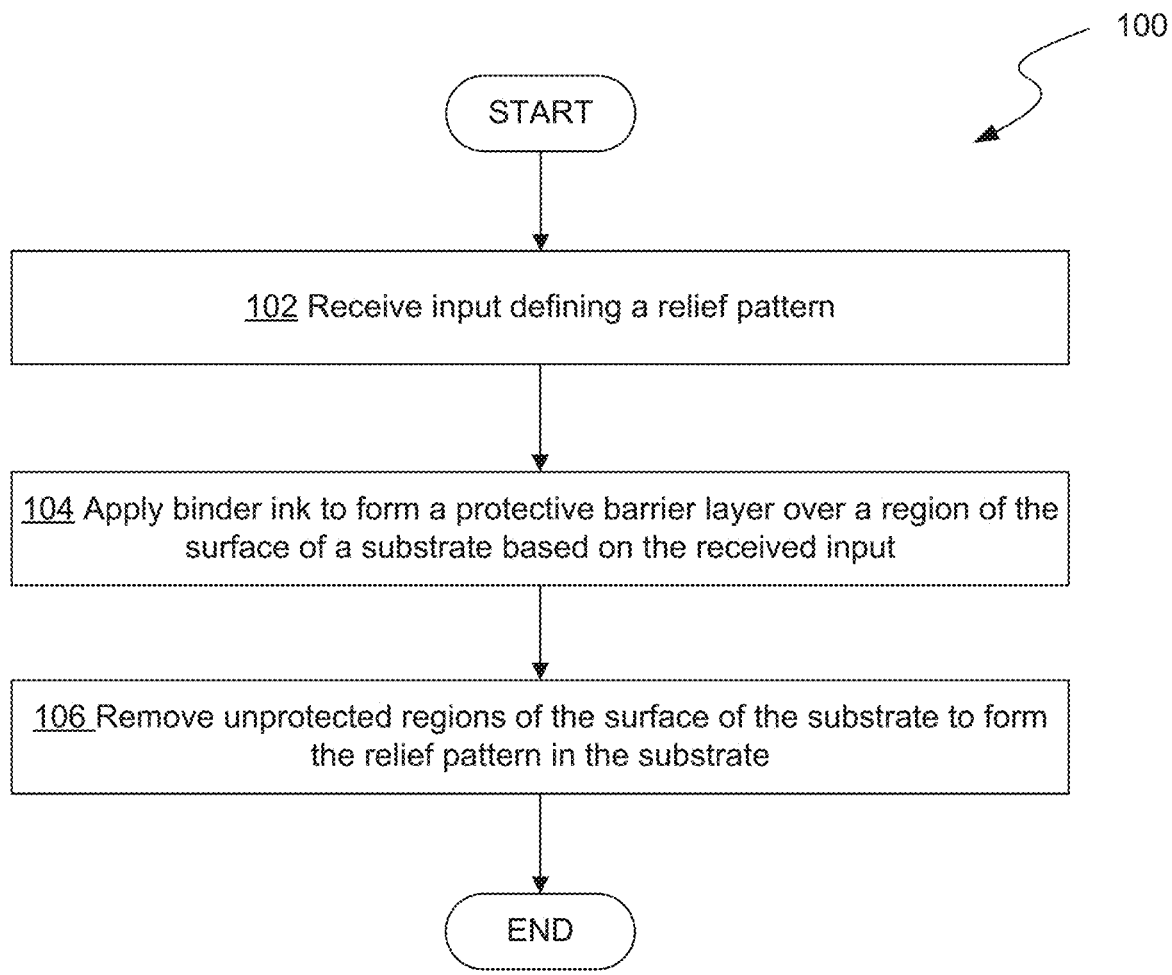
FIG. 1 shows a flowchart illustrating a first example process for applying a three-dimensional (3D) relief to a substrate using digital inkjet technology.

Existing approaches for adding 3D relief to tiles have several drawbacks. For example, current digital processes (additive, subtractive, etc.) result in subtle, poorly defined relief effects due to technological limitations. Further, existing digital processes involving subtractive methods sinking ink) typically involve the use of heavy metals that are both toxic and significantly more expensive to generate. Existing analog stamping processes can result in more well-pronounced 3D relief patterns as compared to existing digital processes. However, existing analog stamping processes allow for limited variation in relief patterns since every stamped tile will have the same relief pattern until the stamping mold is changed. Generating new stamping models is costly and changing between stamping molds during processing is both time and labor intensive.

Introduced herein is technique for applying 3D relief to substrates such as tiles using a digital inkjet technology that addresses the above-mentioned problems with existing approaches. In an example embodiment, the introduced technique includes applying binder ink to a portion of the surface of a substrate (e.g., a tile) using a digital inkjet process. This binder ink forms a barrier layer that protects the portion of the surface of the substrate. Next, a brushing process is applied to remove unprotected portions of the substrate, thereby forming the 3D relief in the substrate.

The incorporation of inkjet technology in the introduced technique eliminates the need for expensive stamping molds while still maintaining the durability of the surface of the substrate unlike existing digital processes. For production efficiency, the introduced technique avoids the added time and labor needed to stop production to change relief designs, reducing production costs and opens more design variability, for example, to mimic the look of "natural" materials. Further, the introduced technique allows for the matching of relief patterns to digitally printed color designs later in the production process, thereby improving design quality and enabling designers to diversify their product offerings.

Terminology

Substrate: A "substrate" refers to any material upon which the disclosed technique for forming a 3D relief can be applied. In example embodiments, the substrate includes an absorbent layer of material upon which ink can be applied using an inkjet process and that can be removed, for example, using a physical process such as brushing. Examples of substrates include hydraulically pressed ceramic green tile (single or double charged), glazed surface, or any other preparation with similar characteristics. The substrate includes at least one (e.g., a top surface) surface upon which the disclosed technique for relief formation is applied. In some embodiments, the surface of the substrate is flat or at least substantially flat (i.e., little change in elevation (e.g., on the order of ±1 millimeter) relative to the length and/or width of the surface of the substrate) although the surface need not be flat in all embodiments.

Relief: Relief generally refers to a difference in elevation on a surface. As used herein, the terms "relief" or "3D relief" may refer to the difference in elevation of the surface of the substrate resulting from the disclosed technique whereby material is removed from certain regions of the surface of the substrate. The pattern formed in the surface of the substrate by the removal of material from certain regions of the substrate is referred to herein as a "relief pattern." As will be described in more detail, the relief pattern can be defined based on a digital image. The relief formed in the substrate may exhibit various characteristics such as depth and gradient. The depth of the relief may be defined as a vertical distance relative to the original surface of the substrate. For example, the disclosed technique may involve removing material up to a particular depth relative to the original surface of the substrate. The relief may also exhibit a gradient based on a ratio between a horizontal distance and a difference in elevation between two points. The gradient may exhibit a constant slope or a slope that varies over the horizontal distance between the two points.

Inkjet Printing: Inkjet printing generally refers to the process of recreating a digital image by propelling droplets of ink fluid onto a substrate. Methods of inkjet printing include continuous inkjet (CIJ), thermal drop-on-demand (DOD) and piezoelectric DOD.

Binder Ink Fluid: Binder ink fluid or simply "binder ink" refers to any fluid that can function to protect material of the substrate (e.g., substrate powders) when applied. In some embodiments, the binder ink is a fluid that can be applied to the substrate using an inkjet printing to form a protective layer on the substrate. In the context of ceramic tile substrate, the binder ink is used to strengthen and protect the ceramic powders in regions of the surface of the tile where it is applied. The binder ink fluid may comprise a resin/polymer aqueous-based or solvent-based solution with properties suitable for use by an inkjet printer. Depending on the specific implementation, the binder ink fluid may include or be used in combination with other materials such as curable materials (e.g., ultraviolet (UV), thermal, two-part, etc.), low melting point waxes, polymers, dispersed particles, or silanes. The binder ink fluid can be substantially transparent or may include a dye or some other pigment to allow the placement of binder ink fluid on the substrate to be observed after application. In a ceramic process, any dye or pigment in the binder ink fluid may be organic-based to allow for removal through incineration during the kiln firing process.

Solvent Ink Fluid: Solvent ink fluid or simply "solvent ink" can be applied, for example using an inkjet process, on top of the protective layer formed by the binder ink, to produce gradient 3D relief formations. When applied, the solvent ink forces the binder ink into substrate. The solvent ink fluid may comprise any type of solution capable of temporarily dissolving the resin (or other material) used for the binder ink. Solvent ink fluids for aqueous and polar-solvent binder inks may comprise, for example, blends of any one or more of the following example solvents: water, ethylene glycol, glycerin, ethylene glycol ethyl ether, diethylene glycol ethyl ether, propylene glycol, dipropylene glycol, dipropylene glycol methyl ether, tripropylene glycol, propylene glycol methyl ether, n-methyl-2-pyrrolidone, methanol, ethanol, isopropanol, n-propanol, butanols, ethyl lactate, acetone and other polar solvents. Solvent ink fluids for mid- to non-polar binder inks may comprise, for example, blends of any one or more of the following solvents: aliphatic hydrocarbon distillates, ethyl acetate, propylene glycol butyl ether, dipropylene glycol methyl ether, dipropylene glycol butyl ether, tripropylene glycol methyl ether, ethylene glycol butyl ether, diethylene glycol butyl ether, methyl ethyl ketone, toluene, xylenes, tetrahydrofuran, methyl amyl ketone, cyclohexanone, and other non-polar solvents.

Brushing: After the binder ink sets, thereby forming a protective layer over the printed regions of the surface of the substrate, a brushing process is applied to physically remove material from the unprinted (i.e., unprotected) regions of the surface of the substrate. This process of removing material from certain regions of the surface of the substrate forms the 3D relief.

Glazing: A glaze may be applied as a post-process after forming the 3D relief according to the disclosed technique. Application of a glaze is typically used in ceramics for decoration (e.g., to add gloss, texture, or color), to seal porous surface, and/or to add an additional layer of protection against wear. The glaze may comprise any material suitable for the underlying substrate and may be applied using known glazing processes such as spray, waterfall, or digital inkjet.

Color Printing: Color printing may be applied as a post-process after forming the 3D relief and/or applying a glaze to add decorative color. Color printing can be applied, for example, using digital inkjet printing (as described above) or by using analog techniques such as gravure, screen printing, etc.

Firing: Firing, in the context of ceramic processing, generally refers to the process of applying heat to the material (e.g., clay and any added glaze) of a "green" substrate to form a final ceramic product. A typical industrial ceramic tile process involves firing for approximately 1-2 hours at a temperature between 1030° C. and 1250° C.

Example Processes for Applying 3D Relief to a Substrate Using Digital Inkjet Technology FIG. 1 is a flowchart illustrating a first example process 100 for applying 3D relief to a substrate using digital inkjet technology. Certain steps of the example process 100 are described with reference to FIGS. 2A-2C which show a sequence of illustrative diagrams depicting processing of a substrate according to the introduced technique. Certain steps of the example process 100 depicted in FIG. 1 may be performed by one or more components of the automated production system 800 depicted in FIG. 8 and/or the example computing system 900 depicted in FIG. 9. The process 100 described with respect to FIG. 1 is an example provided for illustrative purposes and is not to be construed as limiting. Other processes may include more or fewer steps than depicted while remaining within the scope of the present disclosure. Further, the steps depicted in example process 100 may be performed in a different order than is shown.

Example process 100 begins at step 102 with receipt of an input which defines the relief pattern which will be applied to a substrate such as a ceramic tile. The input received at step 102 may include, for example, a digital image of a design upon which the relief pattern will be based. The digital image may comprise any type of data that can be processed by a computer processing system (e.g., processing system 900) to define a relief pattern to be applied to a substrate using the introduced technique. In some embodiments, the digital image may be a monochrome image of a design defining a certain area corresponding to the relief pattern to be printed. In some embodiments, the digital image may be a polychrome image which defines both the relief pattern to be applied as well as coloring (e.g., through color inkjet printing) as a post-process after applying the relief.

In some embodiments, the input received at step 102 may include parameters associated with the processes to be applied to the substrate. For example, such parameters may include a type of substrate (e.g., material type, dimensions, etc.), dimensions of the relief to apply (e.g., depth, gradient, etc.), selections of post-processes to apply (e.g., glazing, color printing, firing, etc.), or any other relevant parameters. Parameters may be input by a user, for example, via a computing device, or received from other components of an automated production system.

Although not depicted in FIG. 1, in some embodiments, step 102 may include processing data (e.g., data included in the received inputs) by a computer processing system. For example, step 102 may include image processing to prepare a received digital image for use in defining a relief pattern. As an illustrative example, a digital image including a design in black against a white background defining a relief pattern may be processed to invert color values such that the printed portions (i.e., the black portions of the image) define areas of the substrate which will be protected from removal, for example, by brushing.

Figure 2:
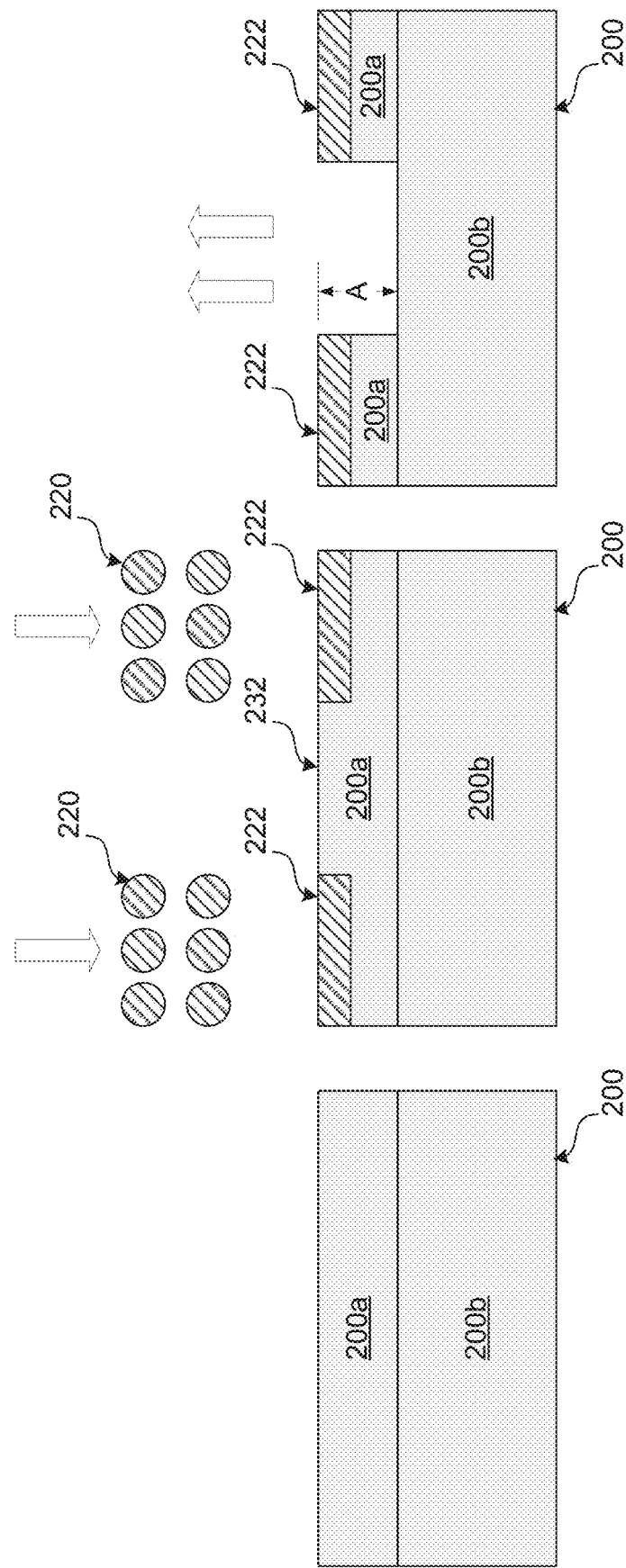
FIGS. 2A-2C show a sequence of illustrative diagrams depicting processing of a first substrate according to the process of FIG. 1.

Example process 100 continues at step 104 with applying binder ink to form a protective layer over a region of the surface of a substrate based upon the received input. FIG. 2A shows a profile view of a substrate 200 and FIG. 2B shows a profile view of the same substrate 200 with binder ink applied to form a protective layer over a region of the surface of the substrate 200.

As previously discussed, in some embodiments, the substrate 200 may be a ceramic tile. The example substrate 200 depicted in FIGS. 2A-2B is multi-layered and includes at least a top layer 200a and a bottom layer 200b. The top layer 200a may be a double charge layer of a double charge vitrified tile. Double charged tiles are typically thicker than standard tiles by a few millimeters (mm) making them well suited to generating relief through subtractive processing. However, a person having ordinary skill in the art will recognize that introduced technique can similarly be applied to substrates having more or fewer than two layers. Further, the depth of the top layer 200a may be exaggerated in FIGS. 2A-2C relative to the depth of the bottom layer 200b for illustrative clarity. In the case of a double charged tile, which typically has a total thickness of approximately 5-10 mm, the top layer 200a (or double charge layer) will typically account for approximately 10-30% of the total thickness.

As depicted in FIG. 2B, the binder ink can be applied using an inkjet process involves propelling droplets 220 of the binder ink into the surface of the substrate 200. The droplets of binder ink 220 are represented by circles that are exaggerated in size relative to the substrate. The typical size of the inkjet droplets is on the order of several microns. The droplets 220 of binder ink are applied to the surface of the substrate 200 via a digital inkjet process to recreate (i.e., print) the digital image (or processed version thereof) received as an input at step 102 of example process 100. In other words, a digital inkjet printer prints a digital image on the surface of the substrate 200 using binder ink. As a result, the surface of the substrate 200 includes regions 222 which are covered in a layer of binder ink and unprotected regions 232 which are not covered in a layer of binder ink.

Note that the protected layer covering regions 222 of the substrate 200 is depicted as extending into the surface of the substrate 200 (the regions of diagonally hatched lines) as opposed to resting on top of the surface of the substrate 200. This may be due to absorption of the binder ink by the porous material of the substrate 200. In other embodiments involving non-porous or less-porous material, the binder ink may instead rest on top of the surface of the substrate. In any case, the depth to which the binder ink is absorbed into the surface of the substrate will depend on a number of factors including the force of the inkjet process, the amount of ink applied, and the porosity of the substrate surface. Further, the depth to which the binder ink is absorbed may be exaggerated in FIGS. 2B and 2C for illustrative clarity and is not necessarily indicative of actual absorption.

Although not depicted in FIG. 1, in some embodiments example process 100 may include waiting for the binder ink to dry or actively applying another process, such as a curing process to finalize formation of the protective layer over certain regions of the surface of the substrate. For example, in some embodiments the binder ink may include or be combined with a curable agent which requires a curing process (e.g., application of heat, UV light, etc.) to form the protective layer.

Once a protective layer is formed by application of the binder ink, example process 100 proceeds to step 106 which includes removing unprotected regions of the surface of the substrate to form the relief pattern in the substrate. For example, FIG. 2C shows the removal of material from the substrate 200 in the unprotected region 232 between the protected regions 222.

In some embodiments, step 106 is performed by brushing away material from the unprotected region 232 of the surface of the substrate. Brushing may be applied manually or preferably automatically using any type of brushing device. Brushes may comprise fibers (e.g., cotton, polyester, polyamide, polyethylene, polyacrylonitrile, polypropylene, wool, or animal hair) that are affixed to rotatable drums or circular pads. The physical properties of the brushes used in the brushing process will depend on several factors such as the type of substrate, the manufacturing process, or decorative requirements. For example, a looser substrate powder, slower production speed, and simple design may require a less aggressive brushing process to achieve a desired decorative effect. In some embodiments, a brushing process is applied to the entire surface of the substrate, but the total brushing area may also be limited depending on the desired decorative effect.

In some embodiments, the removal of material from the substrate at step 106 may be performed using non-contact processes such as compressed air (i.e., air-knife) or powder vacuum. In some embodiments, such non-contact processes may be combined with a mechanical brushing to remove material from the surface of the substrate.

As shown in FIG. 2C, removal of material from the unprotected region 232 of the substrate 200 results in the formation of a 3D relief of depth A relative to the original surface of the substrate 200. In the example depicted in FIG. 2C, the depth A of the 3D relief is equal to the thickness of the top layer 200a of the substrate; however, this may not be the case in all embodiments. For example, in some embodiments, the material of the top layer 200a may exhibit different properties than the material of the bottom layer 200b and the removal process (e.g., brushing) may be specifically calibrated to only remove the material of the top layer 220a. Alternatively, or in addition, the removal process may be calibrated (e.g., based on user input received at step 102) to remove material up to a specified depth A that may differ from the thickness of the top layer 200a. As further depicted in FIG. 2C, the 3D relief formed by the removal process is defined by vertical side walls at right angles to the original horizontal surface of the substrate 200. In other words, the 3D relief depicted in FIG. 2C does not exhibit a gradient. As will be described later, in some embodiments, the process for forming the 3D relief can be altered slightly to impart such a gradient.

The example process 100 described with respect to FIGS. 2A-2C shows the protective layer of binder ink remaining in place after the 3D relief is formed. The binder ink may remain in the substrate until it either evaporates way or is burned away, for example, during a kiln firing process.

Alternatively, in some embodiments this protective layer of binder ink may be removed from the surface of the substrate after the 3D relief is formed, for example, by applying a solvent. The binder ink may be actively removed through application of a solvent if, for example, the presence of such binder ink on the surface of the substrate would interfere with other processes such as glazing or color decoration. In some embodiments, the solvent used to remove the layer of hinder ink may be the same solvent or similar solvent used to form the gradient relief.

Figure 3:
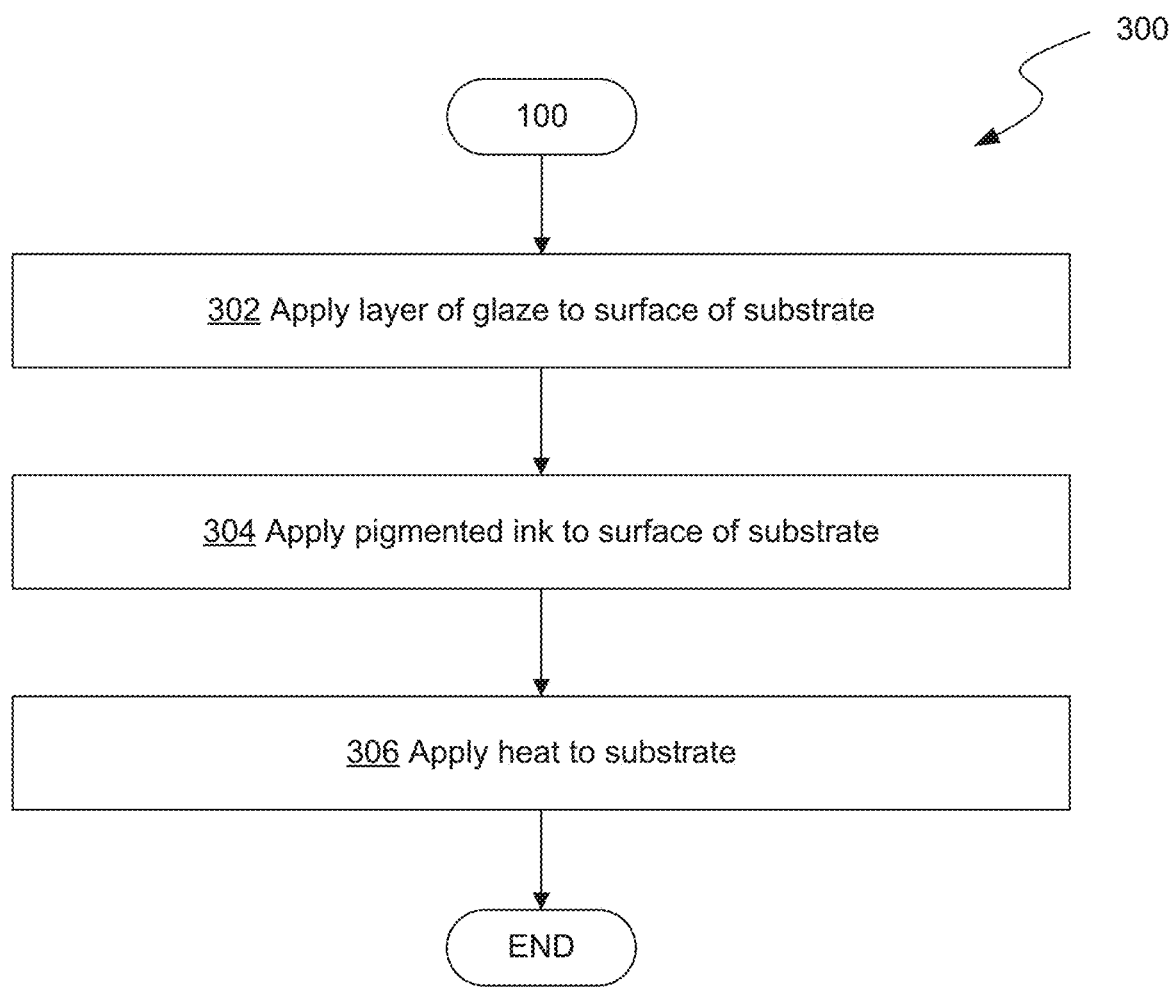
FIG. 3 shows a flowchart illustrating an example process that can be applied to the substrate after the 3D relief has been formed.

As previously mentioned, in some embodiments one or more post-processes may be applied after forming the 3D relief according to the introduced technique. It shall be understood that such post-processes are optional and are not required to actually form the relief. FIG. 3 is a flowchart illustrating an example process 300 that can be applied to the substrate after process 100 has been performed. Certain steps of the example process 300 are described with reference to FIGS. 4A-4C which show a sequence of illustrative diagrams depicting the processing of the substrate according to process 300. Certain steps of the example process 300 depicted in FIG. 3 may be performed by one or more components of the automated production system 800 depicted in FIG. 8 and/or the example computing system 900 depicted in FIG. 9. The process 300 described with respect to FIG. 3 is an example provided for illustrative purposes and is not to be construed as limiting. Other processes may include more or fewer steps than depicted while remaining within the scope of the present disclosure. Further, the steps depicted in example process 300 may be performed in a different order than is shown.

Figure 4:
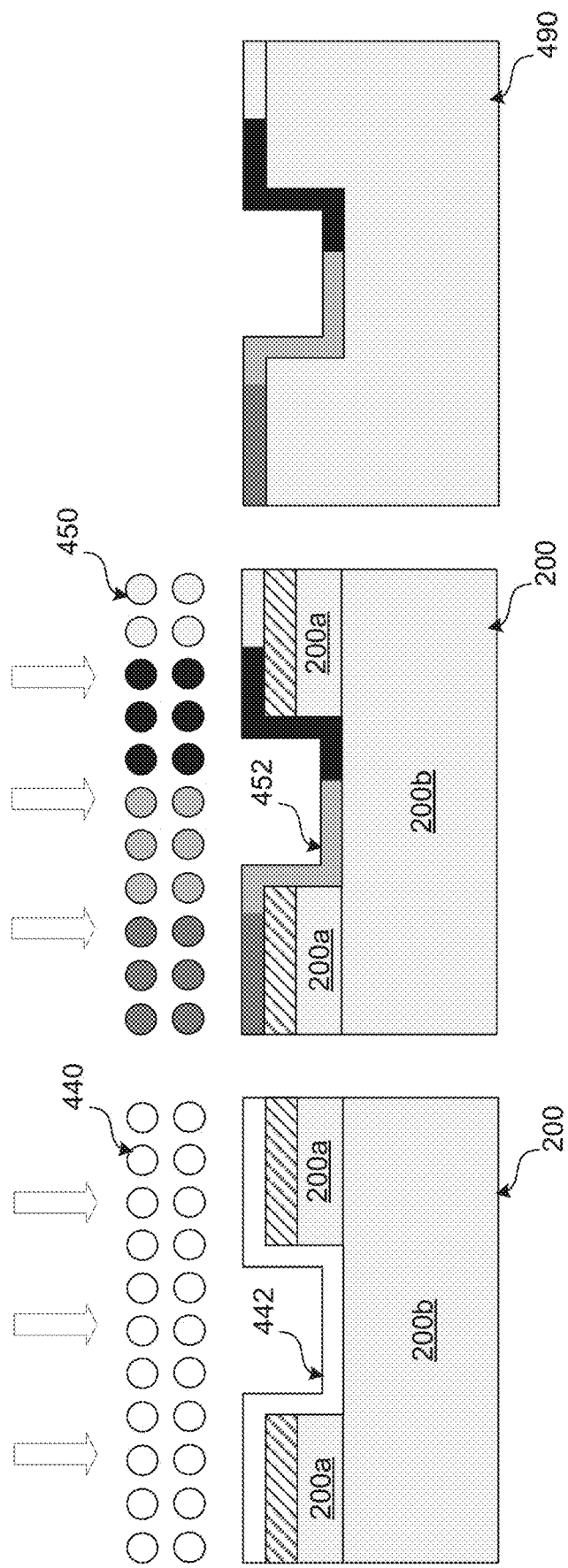
FIGS. 4A-4C show a sequence of illustrative diagrams depicting processing of the first substrate according to the process of FIG. 3.

As mentioned, and as depicted in the flow chart in FIG. 3, process 300 picks up after process 100 is completed. In an example embodiment, process 300 begins at step 302 by applying a layer of glaze to the surface of the substrate 200. As shown in FIG. 4A, in some embodiments, the glaze may be applied by propelling droplets 440 of glaze at the surface of the substrate 200 to produce a layer 442 of glaze that covers the surface of the substrate 200 including the 3D relief. Droplets of glaze may be propelled using any suitable process such as an inkjet printer similar to the application of the binder ink) or any other spraying process (automated or manual). The glaze may also be applied using any other suitable process such brush application (automated or manual) or dipping (automated or manual).

In some embodiments, colored ink may be applied at step 304 after forming the 3D relief in process 100 and/or after applying the glaze at step 302. Color may be applied for decorative purposes or for any other purpose. As shown in FIG. 4B, in some embodiments, the colored ink may be applied, for example, by propelling droplets 450 of one or more colors of ink at the surface of the substrate 200 to produce a layer of color 452 on the surface of the substrate or glaze (if applied). The droplets 450 of colored ink may be propelled using any suitable process such as an inkjet printer (e.g., similar to the application of the binder ink) or any other spraying process (automated or manual). The colored ink may also be applied using any known analog technique such as paintbrush, gravure, screen printing, etc.

In some embodiments, colored ink is applied using inkjet printing based on the same digital image used to print the binder ink in process 100. Using digital inkjet printing to both form the 3D relief and apply decorative color allows the formed relief to match (i.e., align with) the digitally printed color designs. This contrasts with the inherent difficulty in aligning a digitally printed image with a relief formed using an analog process such as stamping. In some embodiments, the colors to be applied during step 304 are defined by data in the digital image itself and/or by additional input received, for example from a user, at step 102.

Depending on the type of substrate used, example process 300 may conclude with, at step 306, firing (i.e., applying heat to) the substrate to produce the final product 490, for example, as depicted at FIG. 4C. Note that the previously defined layers 200a and 200b of substrate 200 have combined through the firing process to produce a final tile product 490. This biting process may similarly be applied without the application of a glaze or decorative color ink. As previously mentioned, a typical industrial ceramic tile process involves firing for approximately 1-2 hours at a temperature between 1030° C. and 1250° C.; however, the specifics of the firing process, if applied, will depend on the material of the substrate.

Figure 5:
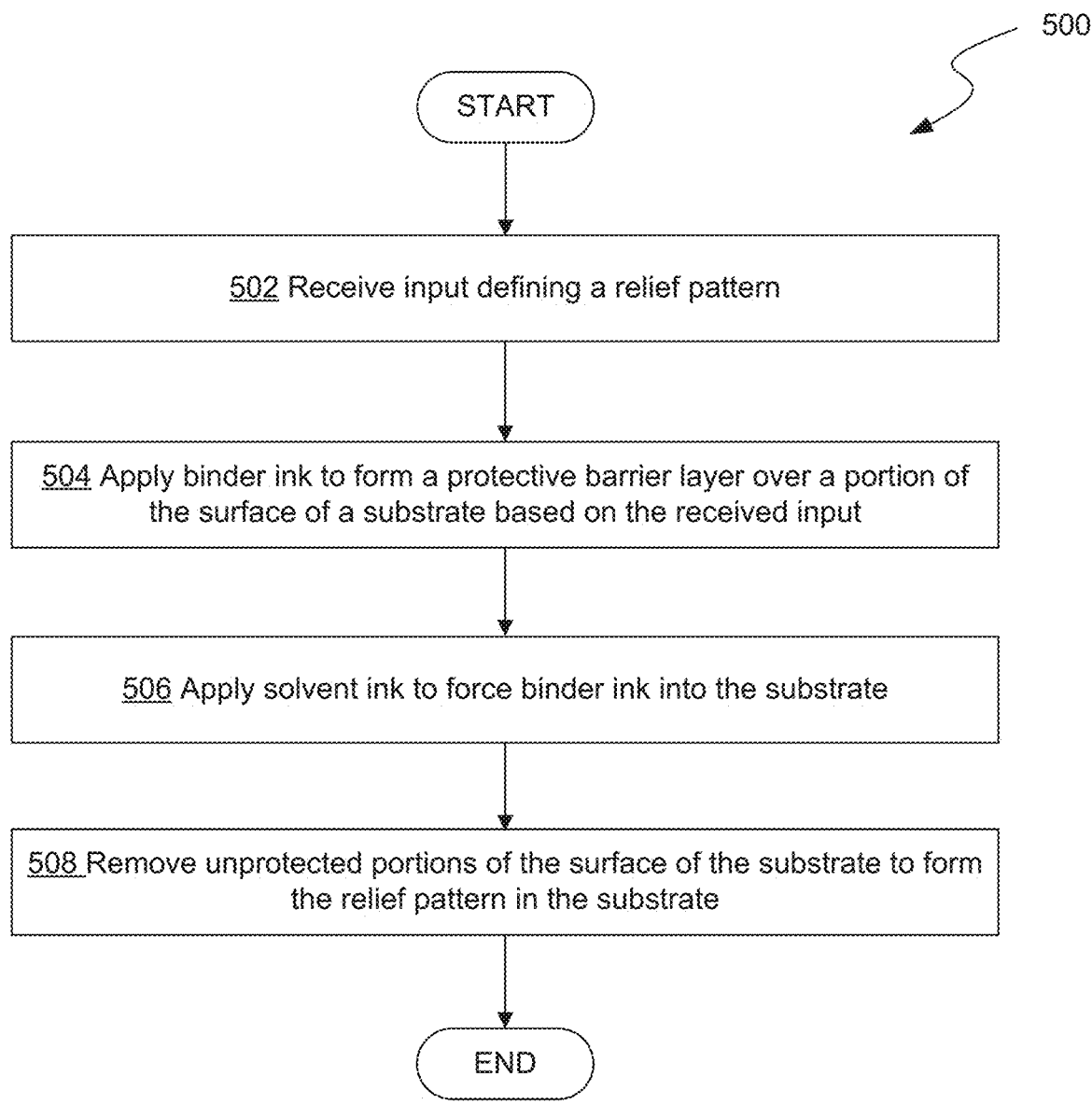
FIG. 5 shows a flowchart illustrating a second example process for applying a 3D relief to a substrate using digital inkjet technology.

The introduced technique can further be used to apply gradient 3D relief to a substrate. FIG. 5 shows a flowchart illustrating a second example process 500 for applying gradient 3D relief to a substrate using digital inkjet technology. Certain steps of the example process 500 are described with reference to FIGS. 6A-6D which show a sequence of illustrative diagrams depicting processing of a substrate according to the introduced technique. Certain steps of the example process 500 depicted in FIG. 5 may be performed by one or more components of the automated production system 800 depicted in FIG. 8 and/or the example computing system 900 depicted in FIG. 9. The process 500 described with respect to FIG. 5 is an example provided for illustrative purposes and is not to be construed as limiting. Other processes may include more or fewer steps than depicted while remaining within the scope of the present disclosure. Further, the steps depicted in example process 500 may be performed in a different order than is shown.

Example process 500 begins at step 502 with receipt of an input defining the relief pattern that will be applied to a substrate such as a ceramic tile. The input received at step 502 may be the same or contain similar data as the input received at step 102 in example process 100 described with respect to FIG. 1. In some embodiments, in addition to defining the relief pattern, the input received at step 502 may define the gradient to be applied in the relief pattern. The gradient may be defined for example, as a separate parameter, for example, input by a user. Alternatively, the gradient may be defined by the digital image included within the input. For example, the digital image may be include gradient values (e.g., between black and white) that, when processed by a computer processing system, can be interpreted as a gradient property of the 3D relief to be formed in the substrate.

Figure 6C:
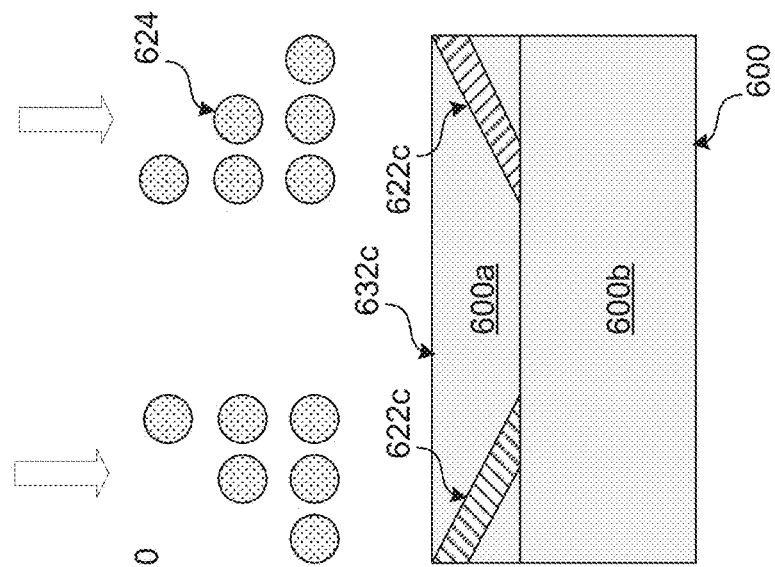
Figure 6B:
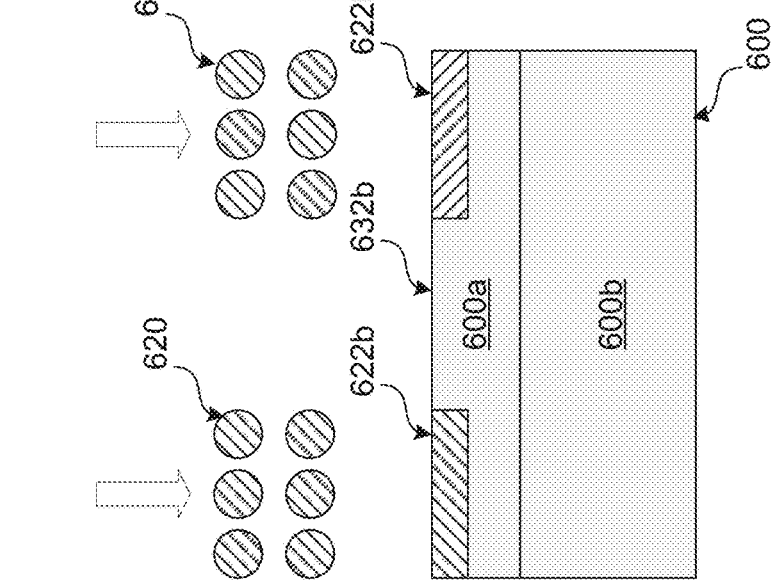
Figure 6A:
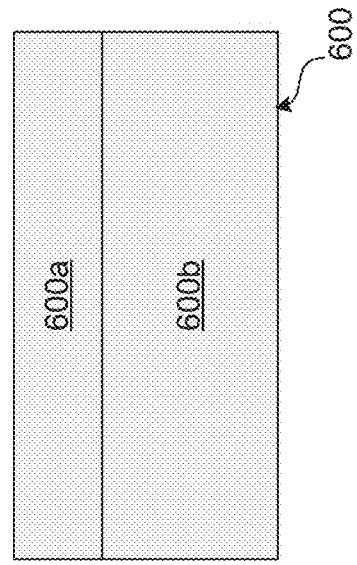

Example process 500 continues at step 504 with applying binder ink to form a protective barrier layer over a portion of the surface of the substrate based upon the input received at step 502. Step 504 of application of binder ink to the surface of a substrate may be the same or similar to step 104 in example process 100 described with respect to FIG. 1. For example, similar to FIG. 2A. FIG. 6A shows a profile view of a substrate 600 which includes a top layer 600a (e.g., a double charge layer) and a bottom layer 600b. FIG. 6B shows a profile view of the same substrate 600 with binder ink applied to form a protective layer over a region of the surface of the substrate 600. As with step 104 in process 100, step 504 may include application of the binder ink using an inkjet process by propelling droplets 620 of the binder ink into the surface of the substrate 600. As a result, the surface of the substrate 600 includes regions 622b that are covered in a layer of binder ink and unprotected regions 632b that are not covered in a layer of binder ink.

Example process 500 continues at step 506 with the application of solvent ink over the applied binder ink to force at least some of the applied binder ink into the substrate. For example, as depicted in FIG. 6C, the solvent ink can be applied using an inkjet process by propelling droplets 624 of solvent ink into the surface of the substrate.

Application of the droplets 624 of solvent ink forces at least some of the previously applied binder ink to sink into the substrate 600.

The depth to which the binder ink sinks into the substrate 600 may depend upon the amount of solvent ink applied at any given area. Varying the amount of solvent ink applied across the surface of the substrate 600 (e.g., as indicated by the varying number of droplets 624) can therefore produce a gradient in the protective layer formed by the binder ink within the substrate 600. This is represented in FIG. 6C by the protected regions 622c that are now within the top layer 600a of the substrate 600 and are at an angle relative to the horizontal surface of the substrate.

The depth to which the binder ink sinks within the substrate will also depend upon the material properties of the substrate. In the example depicted in FIG. 6C, the protective layer 622 of binder ink has only sunk as far as the depth of the top layer 600a (e.g., the double charge layer) of the substrate 600. This may be due, for example, to a higher porosity of the top layer 600a relative to the bottom layer 600b. As previously discussed, the introduced technique can similarly be applied in substrates having more or fewer than two layers. Accordingly, in other embodiments, the addition of solvent ink may affect the layer of binder ink differently than as depicted in FIG. 6C.

Although not depicted in FIG. 5, in some embodiments, example process 500 may include waiting for the binder ink to dry or actively applying another process to finalize formation of the protective layer 622c within the substrate 600. For example, in some embodiments, the binder ink may include or be combined with a curable agent that requires a curing process (e.g., application of heat, UV light, etc.) to form the protective layer 622c. As another example, a washing process may be applied to remove excess solvent ink from the substrate 600.

Once a protective layer is formed by application of the binder ink and solvent ink, example process 500 proceeds to step 508 which includes removing material from unprotected regions (e.g., unprotected region 632c) of the surface of the substrate to form the relief pattern in the substrate. For example, FIG. 6D shows the removal of material from the substrate 600 in the unprotected region 632c between the protected regions 622c.

As shown in FIG. 6C, removal of material from the unprotected region 632c of the substrate 600 results in the formation of a 3D relief of depth B relative to the original surface of the substrate 600. In the example depicted in FIG. 6D, the depth B of the 3D relief is equal to the thickness of the top layer 600a of the substrate; however, this may not be the case in all embodiments. For example, in some embodiments, the material of the top layer 600a may exhibit different properties than the material of the bottom layer 600b and the removal process (e.g., brushing) may be specifically calibrated to only remove the material of the top layer 620a. Alternatively, or in addition, the removal process may be calibrated (e.g., based on user input received at step 502) to remove material up to a specified depth B that may differ from the thickness of the top layer 600a. As further depicted in FIG. 6D, the 3D relief formed by the removal process is defined by sloped side walls. In other words, the resulting relief has a gradient. More specifically, the gradient of the resulting relief can be defined based on the ratio between the elevation change of the sloped side walls (i.e., gradient depth B) and the horizontal length C of the sloped side walls. Note that the resulting side walls in the example depicted in FIG. 6D have a constant slope. The introduced technique can similarly be applied to form side walls with varying slope, for example, by adjusting how the solvent ink is applied at step 506.

As previously mentioned, in some embodiments one or more post-processes may be applied after forming the 3D relief according to the introduced technique. Again, FIG. 3 shows a flowchart illustrating an example process 300 that can be applied to a substrate after forming the relief FIGS. 7A-7C show a sequence of illustrative diagrams depicting the processing of the substrate 600 according to the previously described process 300. Specifically, FIG. 7A shows the application of droplets 740 of glaze to the surface of substrate 600 to form a layer 742 of glaze. FIG. 7B shows the application of droplets 750 of colored ink to produce a layer of color 752 on the surface of the substrate 600 or glaze (if applied). FIG. 7C shows a final product 790 which results from firing the substrate 600.

Figure 8:
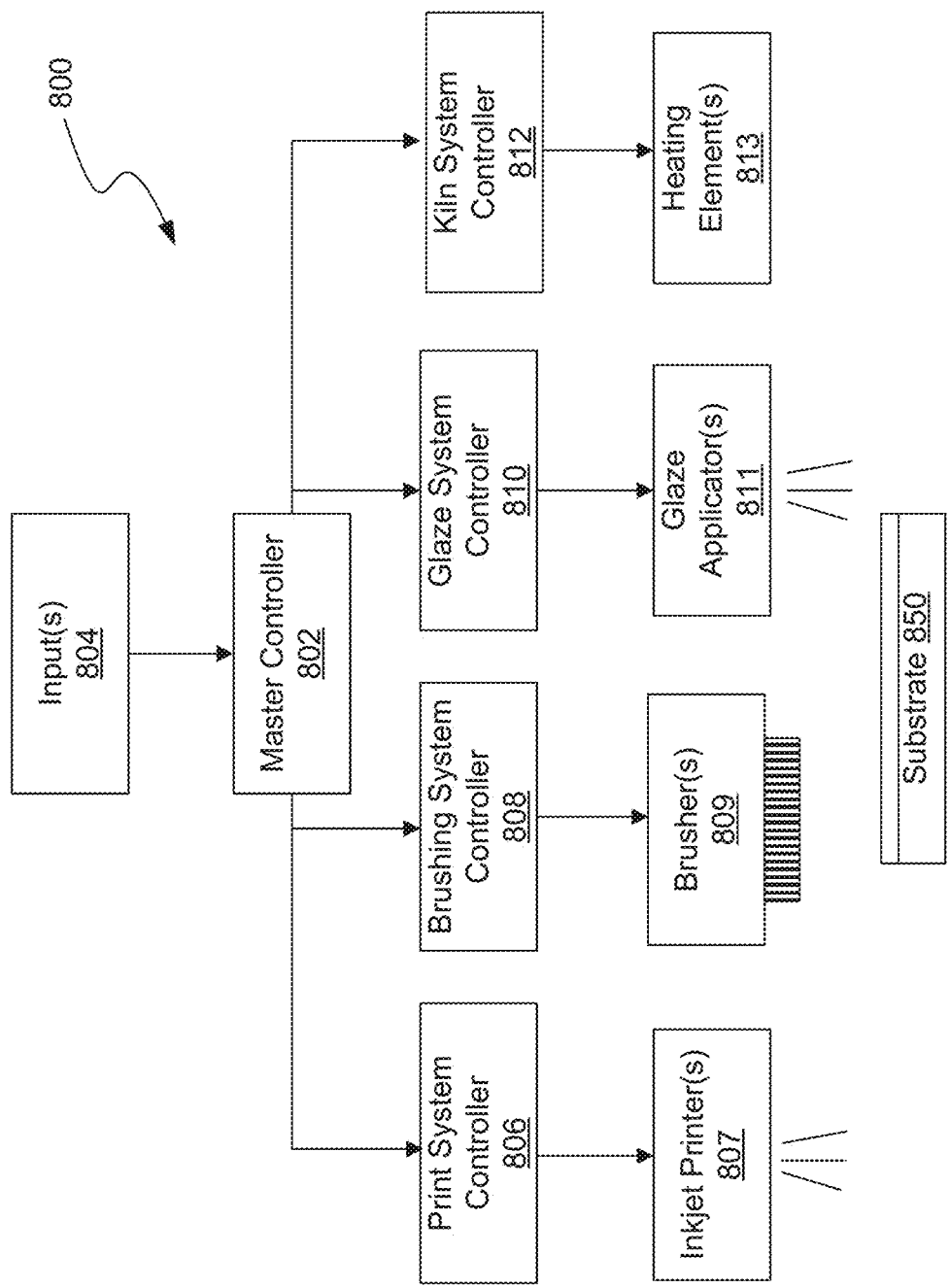
FIG. 8 is a diagram of an example automated production system that can be configured to implement the introduced technique for applying 3D relief to a substrate using digital inkjet technology.

Example Implementation of Applying 3D Relief to a Substrate Using Digital Inkjet Technology FIG. 8 is a diagram of an example automated production system 800 that can be configured to implement the introduced technique for applying 3D relief to a substrate using digital inkjet technology. The automated production system 800 may be configured, for example, to mass produce ceramic tiles with 3D relief using the introduced technique.

The automated production system 800 may include a master controller 802 for the automated production system 800 controls one or more controllers for related subsystems based on received inputs 804. The master controller may include any combination of hardware and/or software configured to receive the inputs 804, process the inputs 804, and generate outputs, for example, in the form of control commands to one or more subsystems based on the processing.

The inputs 804 received by the master controller may include, for example, digital image data and/or any other input as described with respect to steps 102 and 502 of example processes 100 and 500 (respectively).

The automated production system 800 may further include an inkjet printing system configured to apply various types of ink to the surface of a substrate 850. The inkjet printing system may include a print system controller 806 comprising any combination of hardware and/or software configured to receive control commands from the master controller 802, interpret the commands, and generate control commands configured to cause one or more inkjet printers 807 to propel droplets of various types of ink onto the surface of the substrate. The various types of ink may include, for example, binder ink, solvent ink, and color ink. In some embodiments, the inkjet printing system includes multiple inkjet printers each configured to apply to a different type of ink.

The automated production system 800 may further include a brushing system configured to remove material from the surface of a substrate 850 to form 3D relief patterns. The brushing system may include a brushing system controller 808 comprising any combination of hardware and/or software configured to receive control commands from the master controller 802, interpret the commands, and generate control commands configured to cause one or more automated brushers 809 to brush the surface of the substrate 850 to remove material from the surface of the substrate. Although not depicted in FIG. 8, other types of mechanical and/or chemical systems for removal of material from the surface of the substrate 850 may similarly be integrated into an automated production system.

The automated production system 800 may further include a glazing system configured to apply a glaze to the surface of the substrate 850 after the 3D relief has been formed using the inkjet printing system and the brushing system. The glazing system may include a glaze controller 810 comprising any combination of hardware and/or software configured to receive control commands from the master controller 802, interpret the commands, and generate control commands configured to cause one or more glaze applicators 811 to apply a glaze to the surface of the substrate 850. As previously discussed, in some embodiments, glaze maybe applied through inkjet printing, in which case the glazing system may be part of the inkjet printing system. Alternatively, the glazing system may comprise a separate automated system as indicated in FIG. 8.

The automated production system 800 may further include an automated kiln configured to fire the substrate 850 to produce the final tile product. The automated kiln may include a kiln system controller 812 comprising any combination of hardware and/or software configured to receive control commands from the master controller 802, interpret the commands, and generate control commands configured to cause one or more heating elements 813 to apply heat to the substrate 850 to produce the final tile product.

Figure 9:
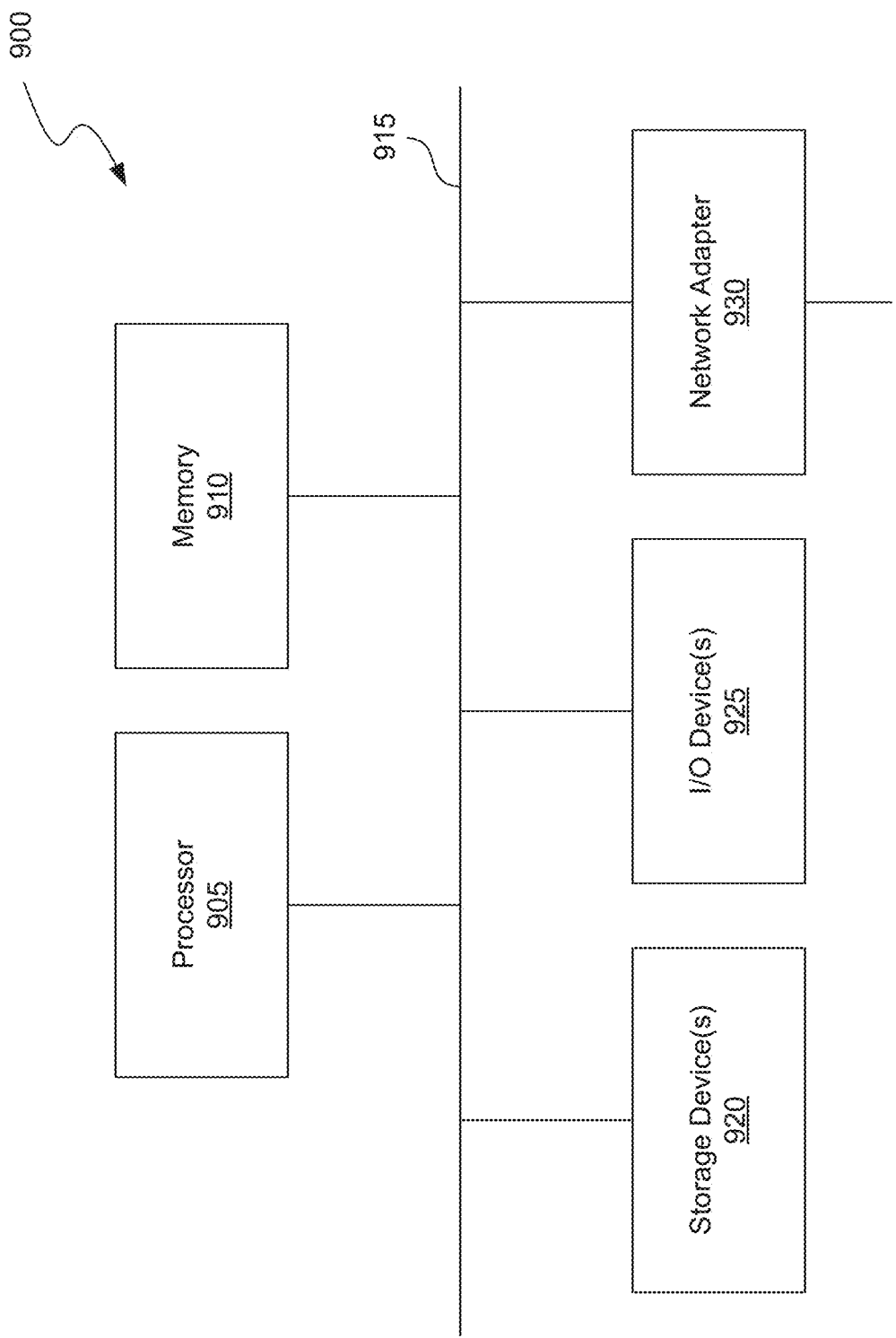
FIG. 9 is a block diagram of an example computing system as may be used to implement certain features of some of the embodiments.

Various components of the automated production system 800, such as the various system controllers 802, 806, 808, 810, and 812 may include one or more of the components of the example computing system 900 described with respect to FIG. 9. It shall be appreciated that the example system 800 described with respect to FIG. 8 is an example and is described in simplified terms for illustrative clarity. A person having ordinary skill will recognize that, in practice, a similar system may include more or fewer components than are shown or may order and arrange the components differently, while still remaining within the scope of the disclosed innovation.

Example Computing System

FIG. 9 is a block diagram of an example computing system 900 as may be used to implement certain features of some of the embodiments. The computing system 900 may be a server computer, a client computer, a personal computer (PC), a user device, a tablet PC, a laptop computer, a personal digital assistant (PDA), a cellular telephone, a telephone, a web appliance, a network router, switch or bridge, a console, a hand-held console, a (hand-held) gaming device, a music player, any portable, mobile, hand-held device, wearable device, or any other machine capable of executing a set of instructions (sequential or otherwise) that specify actions to be taken by that machine.

The computing system 900 may include one or more processing units (e.g., central processing units (CPU) and/or graphical processing units (GPU) (collectively the "processor") 905, one or more memory units (collectively "memory") 910, one or more input/output devices 925 (e.g. keyboard and pointing devices, touch devices, display devices, audio input/output devices, etc.) one or more storage devices 920 (e.g. disk drives, solid state drives, etc.), and one or more network adapters 930 (e.g., network interfaces) that can communicatively couple via an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, an Institute of Electrical and Electronics Engineers (IEEE) standard 1394 bus (also called Firewire), or any other suitable system for facilitating communication between the various components of the example computing system 900.

The memory 910 and storage device 920 are computer-readable storage media that may store instructions that implement at least portions of the various embodiments. In addition, the data structures and message structures may be stored or transmitted via a data transmission medium (e.g., a signal on a communications link). Various communication links may be used such as the Internet, a local area network, a wide area network, or a point-to-point dial-up connection, etc. Thus, computer readable media can include computer-readable storage media, e.g. non-transitory media, and computer-readable transmission media.

The instructions stored in memory 910 can be implemented as software and/or firmware to program the processor 905 to carry out actions described above. In some embodiments such software or firmware may be initially provided to the processor 905 by downloading the software or firmware from a remote system through the computing system 1500, e.g., via network adapter 930.

The various embodiments introduced herein can be implemented by, for example, programmable circuitry, e.g., one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

What is claimed is:

1. A method for forming a gradient three-dimensional (3D) relief in a substrate, the method comprising:
   receiving an input defining a relief pattern;
   applying binder ink to a first region of a surface of the substrate based on the received input, the applied binder ink forming a protective barrier over the first region of the surface of the substrate;
   applying solvent ink to the surface of the substrate after applying the binder ink to the first region of the surface of the substrate;
   wherein applying the solvent ink causes at least some of the binder ink to sink into the surface of the substrate such that the protective layer formed by the binder ink is at a gradient depth relative to the surface of the substrate; and
   removing material from an unprotected second region of the surface of the substrate to form the gradient 3D relief in the substrate based on the relief pattern.

2. The method of claim 1, wherein the input includes a digital image of the relief pattern.

3. The method of claim 1, wherein the binder ink is applied using a digital inkjet process based on the input.

4. The method of claim 1, wherein the input includes a digital image of the relief pattern and wherein applying the binder ink includes:
   processing the received digital image to determine the first region of the surface of the substrate; and
   propelling droplets of the binder ink at the first region of the surface of the substrate to recreate the relief pattern.

5. The method of claim 1, wherein removing the material from the unprotected second region of the surface of the substrate includes:
   brushing the surface of the substrate, wherein brushing the surface of the substrate removes material from the unprotected second region of the surface of the substrate, but does not remote material from the first region of the surface of the substrate due to the protective barrier formed by the binder ink.

6. The method of claim 1, wherein the binder ink includes a resin solution.

7. The method of claim 1, wherein the substrate includes a top layer of absorbent material upon which ink can be applied using digital inkjet printing.

8. The method of claim 1, wherein the substrate is a double charged ceramic tile.

9. The method of claim 1, further comprising:
applying a glaze to the surface of the substrate after forming the gradient 3D relief.

10. The method of claim 1, further comprising:
applying color ink to the surface of the substrate after forming the gradient 3D relief.

11. The method of claim 1, further comprising:
firing the substrate after forming the gradient 3D relief to produce a ceramic tile.

* * * * *